Feb. 21, 1956 A. K. REDCAY 2,735,879
PURIFICATION OF UNSATURATED HYDROCARBON GASES
Filed July 22, 1953
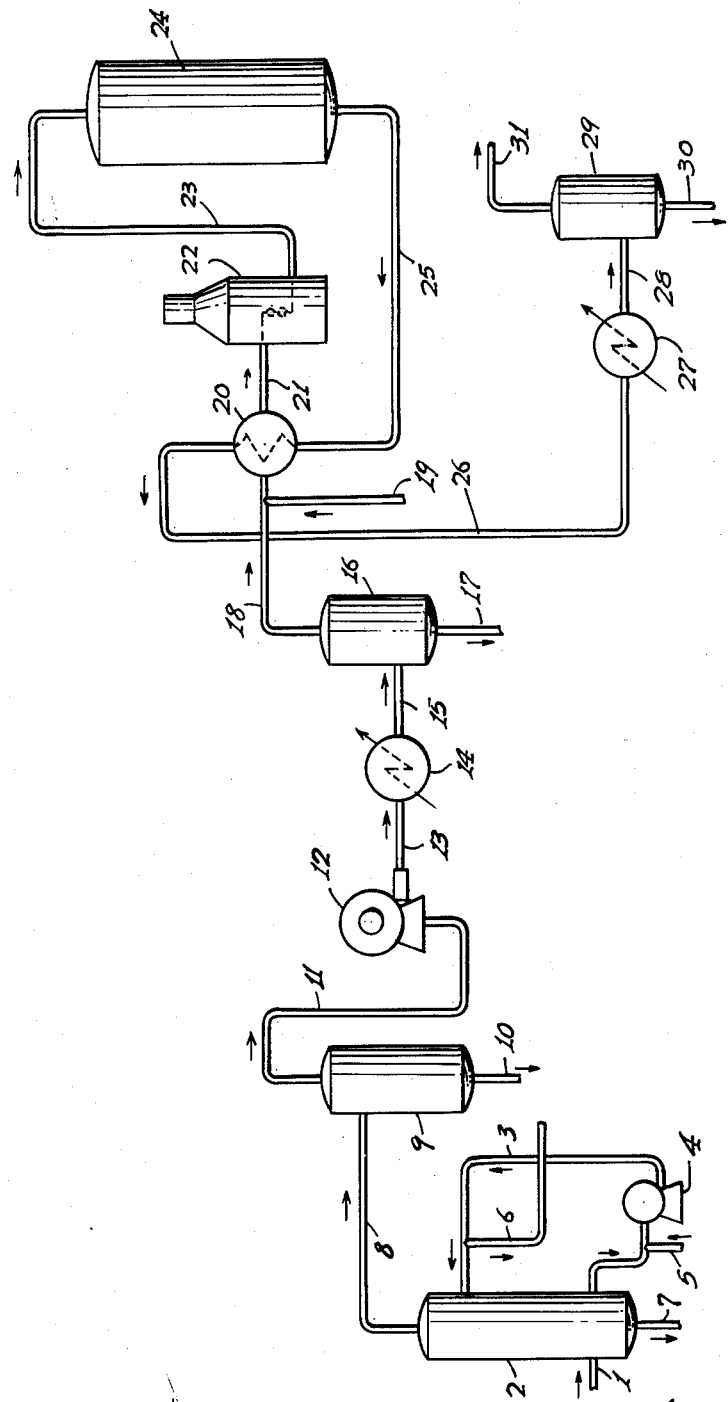
INVENTOR.
Aaron K. Redcay.
BY
Horace B. Cooke
ATTORNEY.

United States Patent Office 2,735,879
Patented Feb. 21, 1956

2,735,879

PURIFICATION OF UNSATURATED HYDROCARBON GASES

Aaron K. Redcay, Mount Lebanon, Pa., assignor to Gulf Oil Corporation, Pittsburgh, Pa., a corporation of Pennsylvania Application July 22, 1953, Serial No. 369,678

9 Claims. (Cl. 260—677)

This invention relates to an improved process for purifying a gaseous mixture comprising olefins contaminated with acetylenic compounds and in particular to a method for selectively hydrogenating acetylenic compounds in a cracked gas mixture containing such compounds and olefins such as ethylene.

A conventional method employed for obtaining olefins such as ethylene comprises cracking petroleum fractions such as ethane, propane, butane, naphtha, gas oil or heavy fuel oils by passing one or more of such materials through a zone heated sufficiently high to decompose such materials and form olefins, hydrogen, saturated hydrocarbons such as ethane, butane and heavier, aromatics, acetylenic compounds such as acetylene itself, water vapor, entrained water, etc. When the cracking operations are carried out at temperatures sufficiently high to obtain economic yields of olefins, for example at temperatures above about 1400° F., excessive amounts of acetylenic compounds are also produced. When the olefins are removed and separated from the cracked gas mixture, the acetylenic compounds have a tendency to remain with the olefins. However, since the acetylenic compounds frequently interfere with the subsequent chemical reactions to which the olefins are normally subjected, for example polymerization of ethylene to polyethylene, it becomes necessary to remove the acetylenic compounds from the gaseous mixture. While very small amounts of acetylenic compounds can be tolerated in the subsequent reactions to which the olefins may be subjected, it is essential that in no event should acetylenic compounds be present in the ethylene in amounts greater than about 150 parts per million for polyethylene manufacture and 1000 parts per million for other chemical reactions.

I have found that a gaseous mixture, and in particular a cracked gas mixture such as identified above, comprising olefins contaminated with acetylenic compounds, such as acetylene itself, and hydrogen can be purified of its acetylenic content by a process which comprises passing said mixture in the presence of added water vapor, the total water vapor content thereof after addition being in excess of that corresponding to saturation at the pressure and temperature of the mixture being processed, over a cobalt molybdate catalyst at an elevated temperature and pressure. More particularly, my improved process comprises compressing said gaseous mixture to an elevated pressure, adding water vapor to said compressed gaseous mixture in an amount such as defined above and thereafter passing said resulting gaseous mixture over a cobalt molybdate catalyst at an elevated temperature and pressure. In a preferred embodiment, the cracked gas mixture, prior to adding additional water vapor thereto but after compression thereof, is treated to remove undesirable contaminants therefrom. In a further preferred embodiment the cracked gas mixture, prior to being compressed, is scrubbed or cleaned to remove therefrom a major portion of undesirable contaminants carried thereby and any entrained water originally present in the gaseous mixture.

The amount of water vapor which must be added to the gaseous mixture being treated after compression to the selected hydrogenation pressure is critical in obtaining the results of my invention, although, as will be shown hereinafter, the total amount which should be present in the final gaseous mixture will be limited. While the amount of water vapor which must be added varies with the temperature and pressure at which the selective hydrogenation reaction of my invention takes place, it is important that the amount of water vapor which must be added to the gaseous mixture should correspond to no less than about 0.5 per cent nor more than about 10 per cent by volume, and preferably from about 1.0 to about 5.5 per cent by volume. If the selected hydrogenation reaction conditions hereinafter set forth are maintained, but less than about 0.5 per cent by volume of water vapor is added to the gaseous mixture being treated, the hydrogenation reaction is not selective and is incomplete. Thus, not only are the acetylenic compounds hydrogenated to ethylenic compounds, but the ethylenic compounds so formed are, in turn, hydrogenated to the corresponding saturated hydrocarbons. In addition the original olefins are also hydrogenated to the corresponding paraffins and a substantial amount, in excess of 150 parts per million, of the acetylenic compounds may remain unaffected during the hydrogenation reaction. Moreover, the catalyst will be contaminated in a relatively short time and will therefore require frequent regeneration and/or replacement. In the event more than about 10 per cent by volume of water vapor is added to the gaseous mixture being treated, the selective hydrogenation reaction becomes negligible, virtually none of the acetylenic compounds are hydrogenated to the corresponding ethylenic compounds and the equipment is used inefficiently. The addition of water vapor within the above desired limits serves to control the selective hydrogenation of acetylenic compounds by selectively controlling the hydrogen partial pressure and extending the life and activity of the catalyst.

Although the amount of water vapor which must be added to the gaseous mixture being treated is critical, the amount of hydrogen which must be present to assure the selective hydrogenation reaction of my invention and obtain a gaseous mixture substantially free of acetylenic compounds is also important. At least sufficient hydrogen should be present to hydrogenate the acetylenic compounds to the corresponding ethylenic compounds. When the gaseous mixture being treated comprises a cracked gas mixture of the type identified above, sufficient hydrogen, in general from about 20 to about 30 per cent by volume, is present to enable the selective hydrogenation to proceed as desired, provided, of course, that other reaction conditions, as already noted and as will hereinafter be described, are maintained. In general, hydrogen in an amount corresponding to about 5 to about 50 per cent by volume and preferably from about 20 to about 30 per cent by volume must be present for the desired reaction. The presence of hydrogen in excess of the maximum described above allows the hydrogenation reaction to proceed too rapidly, with the result that the hydrogenation will be less selective, other compounds such as ethylene being hydrogenated to some extent along with the acetylenic compounds. If less than the minimum amount of hydrogen is present, the catalyst becomes fouled in a very short time and the hydrogenation of acetylenic compounds is no longer selective and complete. To make the hydrogenation complete under such conditions, the temperature of the reaction can be raised, but as the temperature is raised polymers are formed which foul the catalyst surface, and olefins become more susceptible to hydrogenation.

In order to obtain the results of my invention, it becomes necessary to control the other reaction conditions, namely, temperature, pressure and space velocity. The temperature must be maintained from about 350° to about 600° F. and preferably from about 430° to about 500° F. Below about 350° insufficient conversion of acetylenic compounds to ethylenic compounds is obtained, while operation above about 600° F. results in the conversion of too much olefin to the corresponding paraffin. The pressure can be from about atmospheric to about 1500 pounds per square inch gauge and preferably from about 65 to about 90 pounds per square inch gauge. The exact pressure employed will depend upon the concentration of hydrogen which is present. The space velocity (volumes of charge at 60° F. and atmospheric pressure per volume of catalyst per hour) is adjusted to obtain selective and virtually complete acetylene hydrogenation. I have found that a space velocity of about 500 to about 1500, and preferably from about 900 to about 1100, will produce the best results when operating in accordance with my invention with the specific operating conditions set forth above.

The selective hydrogenation reaction is carried out in the presence of a cobalt molybdate catalyst. Not only is excellent selective hydrogenation obtained with this catalyst but it is particularly stable in such a selective hydrogenation process and does not adversely affect the hydrogenation reactions occurring. In addition the catalyst is not poisoned by carbon monoxide or sulfur compounds which are normally present in cracked gas mixtures being treated and which are normally injurious to other acetylene hydrogenation catalysts. While the size of the catalyst is not critical, I have found that ⅛ to ⅜ inch pellets have proved very satisfactory for fixed bed operations. The catalyst can be mounted on a carrier if desired, and in fact, I have obtained excellent results with about 3.3 per cent by weight cobalt molybdate on activated alumina.

It must be remembered that when the gaseous mixture being treated is a cracked gas mixture, such as identified above, a small amount of entrained water, from about 3 to about 10 per cent by volume of water vapor, and undesirable contaminants, such as fine carbon particles, heavy hydrocarbons, some aromatics and tars, are also present. Since these undesirable contaminants would contaminate the catalyst in the hydrogenation reactor if they were permitted to remain in the gaseous mixture, it becomes important to remove them from the cracked gas mixture prior to hydrogenation. This can preferably be done by scrubbing the cracked gas mixture in a wash tower with a scrubbing agent such as No. 2 or No. 6 fuel oil and subsequently passing the treated gas mixture through a separator where additional undesirable contaminants not removed in the wash tower are separated and removed.

However, as an incident to the removal of these undesirable contaminants from the cracked gas mixture the entrained water and an appreciable amount of the water vapor is also removed therefrom. The water content of the cracked gas mixture corresponding to saturation at the pressure and the higher temperature at which it leaves the separator, that is, about atmospheric pressure to about 1500 pounds per square inch gauge and a temperature of about 125° F., is about 0.1 to about 2.5 per cent by volume of water vapor. In the event the cracked gas mixture is compressed to the preferred pressures at which I desire to conduct my hydrogenation reaction, that is, a pressure of about 65 to about 90 pounds per square inch gauge, the water content of the cracked gas mixture corresponding to saturation at such pressure and a temperature of about 125° F., is about 0.6 to about 1.6 per cent by weight.

Accordingly it is seen that the total amount of water vapor that will be present in the cracked gas mixture when it is subjected to the hydrogenation reaction is the sum total of the water vapor content of the cracked gas mixture corresponding to saturation at the pressure and temperature at which it leaves the separator and the water vapor which is added thereto. Thus, while it is absolutely essential that a controlled amount of water vapor as defined above be added to the gaseous mixture being treated after it has been compressed to the desired hydrogenation pressure and contaminants removed therefrom, in no event should the total amount of water vapor in the cracked gas mixture during hydrogenation be less than about 1.5 nor more than about 11 per cent and preferably should be from about 3 to about 7 per cent by volume.

In the event the gaseous mixture being treated is obtained from sources other than from cracking of petroleum fractions and/or does not contain water vapor or undesirable contaminants, the method of treating the gaseous mixture to obtain the desired selective hydrogenation reaction is somewhat simplified since there is no need to subject it to the pretreatment steps noted above to remove objectionable materials such as those which are found in the cracked gas mixture.

The addition of water vapor to the gaseous mixture being treated, however, is changed slightly to obtain the selective hydrogenation desired in accordance with my invention. Since there is no water vapor in the gaseous mixture, an amount of water vapor should be added to the gaseous mixture, after it has been compressed, corresponding to saturation at the pressure and temperature at which the gas may be. To the resulting mixture can be added the additional water vapor, as noted above, to make the hydrogenation reaction selective. As before, the total amount of water vapor in the gaseous mixture should correspond to about 1.5 and 11 per cent, preferably to about 3 to about 7 per cent, by volume of the gaseous mixture being treated. Accordingly, in this modification, the gaseous mixture can be compressed to the desired pressure, the water vapor corresponding to saturation at the pressure and temperature of the gaseous mixture at this stage plus the additional water vapor necessary to obtain selective hydrogenation is added thereto, the resulting mixture is then heated to the desired hydrogenation temperature and the heated gaseous mixture is subsequently passed over a cobalt molybdate catalyst to selectively hydrogenate the acetylenic compounds.

A preferred method of carrying out my invention may be illustrated by reference to the single drawing which describes a flow diagram of such preferred procedure. The drawing is hereby incorporated and made a part of this specification. In order to simplify the description of the process, flow devices such as valves, etc., have not been shown.

The gaseous mixture which may be received at a temperature of about 85° to about 110° F. and a pressure of about atmospheric and comprises olefins contaminated with acetylenic compounds and containing water vapor, entrained water, undesirable contaminants such as fine carbon particles, heavy hydrocarbons, aromatics, tars, etc., is preferably initially passed through line 1 to wash tower 2 where it is scrubbed to remove undesirable contaminants therefrom and thereby prevent them from entering the hydrogenation reactor and depositing on the catalyst therein. The scrubbing medium, which may comprise a mineral oil such as No. 2 or No. 6 fuel oil, is passed through tower 2 countercurrent to the movement of the cracked gas mixture and is continuously circulated therethrough through means of line 3 containing pump 4. If desired, I may use as a scrubbing medium in place of No. 2 or No. 6 fuel oil, water having incorporated therein a detergent of the alkyl aryl sulfonate type such as Oronite D–40. Make-up scrubbing medium is introduced into line 3 through line 5 and a portion of the scrubbing medium contaminated with undesirable constituents from the cracked gas mixture is continuously removed from line 3 through line 6. A major amount of the contaminants, along with entrained water, are removed from the base of tower 2 through draw-off line 7.

The gaseous mixture is removed from the top of tower 2 and is passed by line 8 to separator drum 9 where any entrained scrubbing medium coming over with the treated gas is separated therefrom. The scrubbing medium separated therein can be removed from the base of separator drum 9 through line 10.

The gaseous mixture substantially free of entrained scrubbing medium is removed from the upper portion of separator drum 9 and is passed through line 11 to compressor 12 or a series of compressors where the gaseous mixture is compressed to a pressure which can be about atmospheric to about 1500 pounds per square inch gauge. The temperature of the gaseous mixture as a result of compression is raised to a temperature of about 200° to about 300° F., preferably to a temperature of about 225° to about 250° F. The gaseous mixture is removed from compressor 12 by line 13 and is passed through cooler 14 which can be cooled by any suitable means such as water.

The gases leaving cooler 14 through line 15 at a temperature of about 60° to about 125° F., preferably about 85° to about 110° F., are introduced into separator 16. Undesirable hydrocarbon constituents not removed previously in wash tower 2, such as heavy hydrocarbons, aromatics, tars, etc., are condensed and separated from the gaseous mixture therein and are removed from the base of the separator through line 17. By removing these undesirable contaminants in separator 16, they are prevented from finding their way into the hydrogenation reactor and depositing on the catalyst therein. As an incident to separation of these undesirable contaminants, however, water vapor which has condensed in the separator is removed along with the undesirable contaminants in line 17.

The water content of the gaseous mixture leaving separator 16 corresponding to saturation at a pressure of about atmospheric to about 1500 pounds per square inch gauge and a temperature of about 125 F. is about 0.1 to about 2.5 per cent by volume of water vapor. To the gaseous mixture is added the desired amount of water vapor for operation in accordance with my invention. As noted, depending upon the temperature and pressure of the hydrogenation reaction, the amount of water vapor which is added should be enough to bring the total amount of water vapor to no less than about 1.5 per cent but no more than about 11 per cent by volume. Preferably the total amount should be from about 3 to about 7 per cent by volume when the hydrogenation reaction is to be conducted at a pressure of about 65 to about 90 pounds per square inch gauge and a temperature of about 430° to about 500° F. The water vapor is preferably added to the gaseous mixture in line 19 in the form of steam at a temperature of about 400° F. and a pressure slightly above the pressure of the gaseous mixture. While the steam can be added to the gaseous mixture at any point before it enters the hydrogenation reactor, and can in fact be added in the hydrogenation reactor itself, it is preferred to add steam or water vapor to the gaseous mixture immediately after it leaves separator 16.

The resulting mixture is then passed to heat exchanger 20 where the gaseous mixture is heated to a temperature of about 150° to about 350° F. through indirect heat exchange with the hydrogenation products produced in the process. The gases at this temperature are removed from heat exchanger 20 by line 21 and are introduced into heater 22 where the gases are further heated to a temperature of about 350° to about 600° F. The heated gases are then passed through line 23 to hydrogenation reactor 24 which is packed with a cobalt molybdate catalyst, preferably disposed on a carrier in a series of vertical beds. The gaseous mixture is then flowed through hydrogenation reactor 24 at a space velocity of about 500 to about 1500, a temperature of about 350° to about 600° F. and a pressure of about atmospheric to about 1500 pounds per square inch gauge and in the presence of about 1.5 to about 11 per cent by volume of total water vapor and from about 5 to about 50 per cent by volume of hydrogen. Under these conditions, the gaseous mixture is purified of its acetylenic content by the almost complete hydrogenation of the acetylenic compounds to ethylenic compounds, while at the same time the olefin constituents remain virtually unaffected.

The purified gaseous mixture is removed from the base of hydrogenation reactor 24 by line 25 and is passed through heat exchanger 20. As previously described, the gaseous mixture leaving separator 16, to which additional water has been added, is heated by indirect heat exchange with the heated purified gaseous mixture to a temperature of about 150° to about 350° F. From heat exchanger 20, the purified gaseous mixture is led by line 26 to cooler 27, which can be cooled by any suitable means such as running water. The purified gaseous mixture leaving cooler 27 through line 28 at a temperature of about 85° to about 110° F. is then passed to separator 29 where water and polymers which may be formed are removed and separated by line 30. The resulting gaseous mixture is removed overhead from separator 29 by line 31 and passed to a compressor and subsequently to separation equipment where the olefin such as ethylene is removed from the purified gaseous mixture.

The advantages of operating in accordance with my invention can best be illustrated by my reference to the following examples. Example 1 illustrates operation in accordance with my invention except that no water vapor is added to the cracked gas mixture being treated.

*Example 1*

A cracked gas mixture, which had been treated to remove therefrom the undesirable hydrocarbon constituents referred to previously, comprising 34.1 per cent methane, 26.7 per cent hydrogen, 32.8 per cent ethylene, 4000 parts per million acetylene, lesser amounts of ethane, propylene, propane, butanes, butadiene, carbon monoxide, carbon dioxide and nitrogen, and containing about 1.9 per cent by volume of water vapor, which water vapor corresponds to saturation at a pressure of about 85 pounds per square inch gauge and a temperature of about 85° to about 110° F., was passed over 3.3 per cent by weight cobalt molybdate catalyst on activated alumina at a temperature of about 445° F., a pressure of about 85 pounds per square inch gauge and a space velocity of about 1000. The acetylene content of the treated gaseous mixture was 19 parts per million and about 1.5 per cent by volume of the ethylene content was hydrogenated to ethane.

It will be seen in Example 1 that the temperature, pressure and space velocity employed are in the preferred ranges. The only water vapor present was that corresponding to saturation at the temperature and pressure of the gas after compression, for no additional vapor was added to the gaseous mixture. While the acetylene content of the treated gaseous mixture was satisfactory, an excessive amount of ethylene was hydrogenated to ethane. Thus the hydrogenation reaction was not selective.

The importance of carrying out the hydrogenation reaction in the presence of a controlled amount of water vapor is illustrated in Example 2.

*Example 2*

The run carried out in Example 1 was repeated except that about 4.1 per cent by volume of steam was added to the gaseous mixture and the hydrogenation reaction was carried out at temperatures varying from about 450° to about 500° F. Since the original gaseous mixture contained about 1.9 per cent by volume of water vapor, which corresponded to the water vapor content at saturation at the pressure and temperature of the gaseous mixture after compression, the total amount of water vapor in the gaseous mixture was about 6 per cent by volume. In this run the acetylene content of the treated gas varied from about 0 to about 10 parts per million and there was no ethylene hydrogenation. There was no appreciable quantity of acetylene hydrogenated to ethane.

It is apparent from a comparison of Examples 1 and 2 that operation within the preferred operating conditions in the presence of a controlled amount of water vapor in excess of the water vapor content corresponding to saturation at the pressure and temperature of the gaseous mixture after compression assures the selective hydrogenation reaction desired, that is, substantially complete hydrogenation of acetylene with no appreciable hydrogenation of either acetylene or ethylene to ethane. Accordingly, not only are cracked gas mixtures containing an olefin and contaminated with acetylenic compounds when treated in accordance with my invention purified of their acetylenic content, but also the yield of desirable olefins such as ethylene is increased.

The run set forth in Example 2 was carried out for a period of 78 days to determine the effect of operation over long periods of time on the quality of products obtained and on the strength and life of the catalyst. The results of this 78-day test are summarized below in the table.

TABLE

| Days on Stream | Temperature, °F. | Acetylene in Treated Gas | Percent Ethylene Hydrogenated |
| --- | --- | --- | --- |
| 1 | 440 | 0 | None. |
| 29 | 445 | 0-10 | None. |
| 35 | 450 | 0 | None. |
| 78 | 460 | 0-10 | None. |

Though the catalyst was not regenerated during the 78-day test period, the results were excellent, for even at the end of the 78-day test period substantially all of the acetylene was hydrogenated to ethylene but no ethylene was hydrogenated to ethane. Generally, when operations are conducted in accordance with the above conditions but without the presence of the stated amount of water vapor, the catalyst requires regeneration within about 50 days, a large amount of acetylene will remain unaffected and some of the acetylene and ethylene are hydrogenated to paraffins.

At the end of the 78-day test period, the catalyst was removed from the unit for inspection. The physical strength of the catalyst was excellent. There was no polymer deposit upon the catalyst and the crush strength was about 514 pounds, compared to about 558 pounds for the original catalyst.

While I have described in the specification and shown in the flow diagram operation in accordance with my invention in which but one hydrogenation reactor is employed, this is merely illustrative and the invention is not so limited. It is apparent that if desired, I may employ hydrogenation reactors in parallel in place of the one shown. While the invention has been described as involving the addition of a controlled amount of water vapor to a gaseous mixture prior to hydrogenation, my invention may be practiced as long as the hydrogenation reaction itself is effected in the presence of the controlled amount of water vapor as hereinabove set forth. Accordingly, I can introduce the desired amount of water vapor into the hydrogenation reactor at one or more points and still obtain the selective hydrogenation reaction desired. An additional advantage of introducing water vapor into the hydrogenation reactor itself rather than to the impure gaseous mixture before introduction into the hydrogenation reactor, and particularly at one or more points in the hydrogenation reactor, is the comparative case by which the temperatures in the hydrogenation reactor are thereby controlled.

Obviously, many modifications and variations of the invention, as hereinafter set forth, may be made without departing from the spirit and scope thereof and, therefore, only such limitations should be employed as are indicated in the appended claims.

I claim:

1. A process for selectively hydrogenating acetylenic compounds in a mixture comprising said compounds, olefins and hydrogen at least in an amount sufficient to hydrogenate said acetylenic compounds to the corresponding ethylenic compounds which comprises passing said mixture in the presence of added water vapor, the total water vapor content thereof after addition being in excess of that corresponding to saturation at a selected pressure within the range of about atmospheric to about 1500 pounds per square inch gauge and a temperature of about 125° F. but being no less than about 1.5 per cent nor more than about 11 per cent by volume, over a cobalt molybdate catalyst at said pressure and at a temperature of about 350° to about 600° F.

2. A process for selectively hydrogenating acetylenic compounds in a mixture comprising said compounds, olefins and from about 5 to about 50 per cent by volume of hydrogen which comprises passing said mixture in the presence of added water vapor, the total water vapor content thereof after addition being in excess of that corresponding to saturation at a selected pressure within the range of about atmospheric to about 1500 pounds per square inch gauge and a temperature of about 125° F. but being no less than about 3 per cent nor more than about 7 per cent by volume, over a cobalt molybdate catalyst at said pressure and at a temperature of about 430° to about 500° F.

3. A process for selectively hydrogenating acetylenic compounds in a mixture comprising said compounds, olefins and from about 20 to about 30 per cent by volume of hydrogen which comprises passing said mixture in the presence of added water vapor, the total water vapor content thereof after addition being in excess of that corresponding to saturation at a selected pressure within the range of about 65 to about 90 pounds per square inch gauge and a temperature of about 125° F. but being no less than about 3 per cent nor more than about 7 per cent by volume, over a cobalt molybdate catalyst at said pressure and at a temperature of about 430° to about 500° F.

4. A process for selectively hydrogenating acetylenic compounds in a mixture comprising said compounds, olefins and from about 5 to about 50 per cent by volume of hydrogen which comprises compressing said mixture to a selected pressure within the range of about atmospheric to about 1500 pounds per square inch gauge, said mixture being heated to an elevated temperature during compression, adding water vapor to said compressed mixture in an amount such that the total water vapor content thereof after addition will be in excess of that corresponding to saturation at said pressure and a temperature of about 125° F. but will be no less than about 1.5 per cent nor more than about 11 per cent by volume, heating said resulting mixture to a temperature of about 350° to about 600° F., and thereafter passing the latter heated mixture over a cobalt molybdate catalyst at said pressure.

5. A process for selectively hydrogenating acetylenic compounds in a mixture comprising said compounds, olefins and from about 20 to about 30 per cent by volume of hydrogen which comprises compressing said mixture to a selected pressure within the range of about 65 to about 90 pounds per square inch gauge, said mixture being heated to an elevated temperature during compression, adding water vapor to said compressed mixture in an amount such that the total water vapor content thereof after addition will be in excess of that corresponding to saturation at said pressure and a temperature of about 125° F. but will be no less than about 3 per cent nor more than about 7 per cent by volume, heating said resulting mixture to a temperature of about 430° to about 500° F., and thereafter passing the latter heated mixture over a cobalt molybdate catalyst at said pressure.

6. A process for selectively hydrogenating acetylenic compounds in a cracked gas mixture comprising said compounds, olefins, about 5 to about 50 per cent by volume of hydrogen, about 3 to about 10 per cent by volume of water vapor and undesirable hydrocarbon contaminants which comprises compressing said mixture to a selected pressure within the range of about atmospheric to about 1500 pounds per square inch gauge, said mixture being heated to a temperature of about 200° to about 300° F. during compression, cooling said compressed mixture to a temperature of about 60° to about 25° F., separating undesirable hydrocarbon contaminants and water condensed at said pressure and said latter temperature from said cooled compressed mixture, said resulting mixture containing from about 0.1 to about 2.5 per cent by volume of water vapor and representing the water vapor content of the resulting mixture corresponding to saturation at said pressure and a temperature of about 125° F., adding water vapor to said resulting mixture in an amount equal to about 0.5 to about 10 per cent by volume to obtain a final mixture containing about 1.5 to about 11 per cent by volume of total water vapor, heating said final mixture to a temperature of about 350° to about 600° F., and thereafter passing said heated final mixture over a cobalt molybdate catalyst at said pressure.

7. A process of selectively hydrogenating acetylenic compounds in a cracked gas mixture comprising said compounds, olefins, about 20 to about 30 per cent by volume of hydrogen, about 3 to about 10 per cent by volume of water vapor and undesirable hydrocarbon contaminants which comprises compressing said mixture to a selected pressure within the range of about 65 to about 90 pounds per square inch gauge, said mixture being heated to a temperature of about 225° to about 250° F. during compression, cooling said compressed mixture to a temperature of about 85° to about 110° F., separating undesirable hydrocarbon contaminants and water condensed at said pressure and said latter temperature from said cooled compressed mixture, said resulting mixture containing from about 0.6 to about 1.6 per cent by volume of water vapor and representing the water vapor content of the resulting mixture corresponding to saturation at said pressure and a temperature of about 125° F., adding water vapor to said resulting mixture in an amount equal to about 1.0 to about 5.5 per cent by volume to obtain a final mixture containing about 3 to about 7 per cent by volume of total water vapor, heating said final mixture to a temperature of about 430° to about 500° F., and thereafter passing said heated final mixture over a cobalt molybdate catalyst at said pressure.

8. A process for selectively hydrogenating acetylenic compounds in a cracked gas mixture comprising said compounds, olefins, about 5 to about 50 per cent by volume of hydrogen, about 3 to about 10 per cent by volume of water vapor, undesirable hydrocarbon contaminants, and entrained water which comprises scrubbing said mixture to remove said entrained water and a major portion of said hydrocarbon contaminants therefrom, compressing said mixture to a selected pressure within the range of about atmospheric to about 1500 pounds per square inch gauge, said mixture being heated to a temperature of about 200° to about 300° F. during compression, cooling said compressed mixture to a temperature of about 60° to about 125° F., separating additional undesirable hydrocarbon contaminants not removed during said scrubbing and water condensed at said pressure and said latter temperature from said cooled compressed mixture, said resulting mixture containing from about 0.1 to about 2.5 per cent by volume of water vapor and representing the water vapor content of the resulting mixture corresponding to saturation at said pressure and a temperature of about 125° F., adding water vapor to said resulting mixture in an amount equal to about 0.5 to about 10 per cent by volume to obtain a final mixture containing about 1.5 to about 11 per cent by volume of total water vapor, heating said final mixture to a temperature of about 350° to about 600° F. and thereafter passing said heated final mixture over a cobalt molybdate catalyst at said pressure and a space velocity of about 500 to about 1500.

9. A process for selectively hydrogenating acetylenic compounds in a cracked gas mixture comprising said compounds, olefins, about 20 to about 30 per cent by volume of hydrogen, about 3 to about 10 per cent by volume of water vapor, undesirable hydrocarbon contaminants, and entrained water which comprises scrubbing said mixture to remove said entrained water and a major portion of said hydrocarbon contaminants therefrom, compressing said mixture to a selected pressure within the range of about 65 to about 90 pounds per square inch gauge, said mixture being heated to a temperature of about 225° to about 250° F. during compression, cooling said compressed mixture to a temperature of about 85° to about 110 F., separating additional undesirable hydrocarbon contaminants not removed during said scrubbing and water condensed at said pressure and latter temperature from said cooled compressed mixture, said resulting mixture containing from about 0.6 to about 1.6 per cent by volume of water vapor and representing the water vapor content of the resulting mixture corresponding to saturation at said pressure and a temperature of about 125° F., adding water vapor to said resulting mixture in an amount equal to about 1.0 to about 5.5 per cent by volume to obtain a final mixture containing about 3 to about 7 per cent by volume of total water vapor, heating said final mixture to a temperature of about 430° to about 500° F., and thereafter passing said heated final mixture over a cobalt molybdate catalyst at said pressure and a space velocity of about 900 to about 1100.

References Cited in the file of this patent

UNITED STATES PATENTS

| | | |
|---|---|---|
| 1,842,010 | Braus | Jan. 19, 1932 |
| 2,359,759 | Hebbard et al. | Oct. 10, 1944 |
| 2,433,603 | Danner et al. | Dec. 30, 1947 |
| 2,642,383 | Berger | June 16, 1953 |

OTHER REFERENCES

Copenhaver et al.: "Acetylene and Carbon Monoxide Chemistry" (1949), pages 16–18, published by Reinhold Publishing Corp., New York, N. Y.

Reppe: "Acetylene Chemistry," page 18 (1949), (P. B. Report 18852–S), (translated from the German), published by Charles A. Meyer.